June 18, 1940.            C. V. DAME            2,204,751
LIQUID DISTRIBUTING APPARATUS
Filed May 26, 1938            3 Sheets-Sheet 2
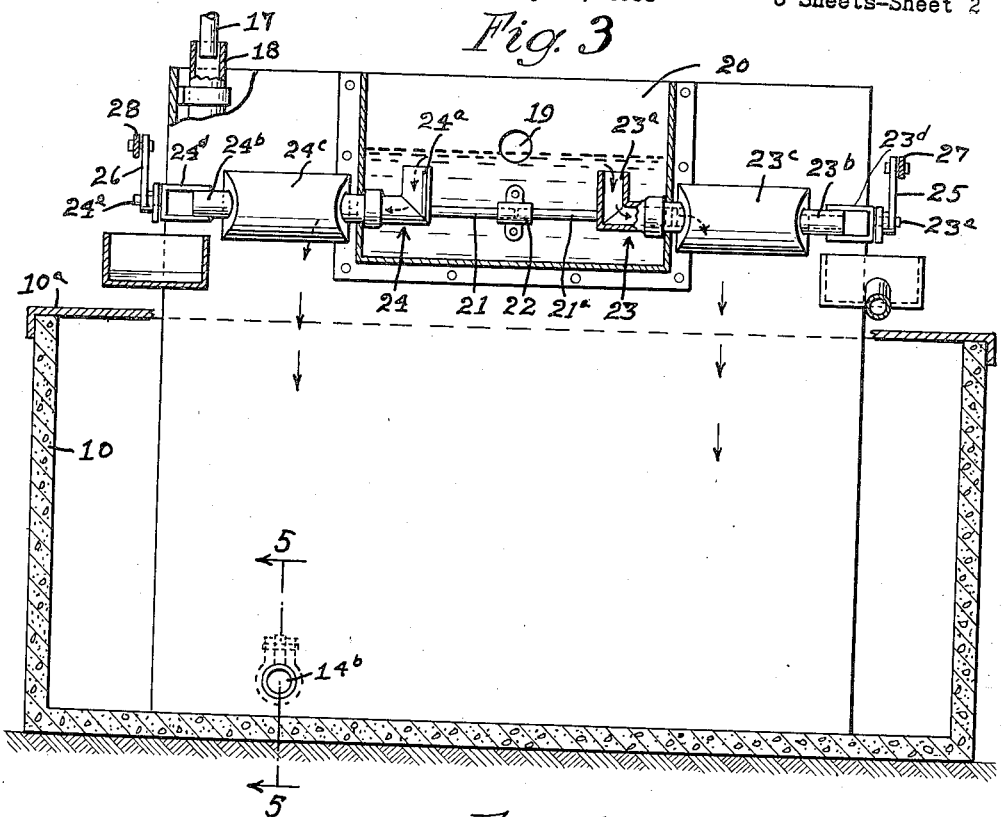
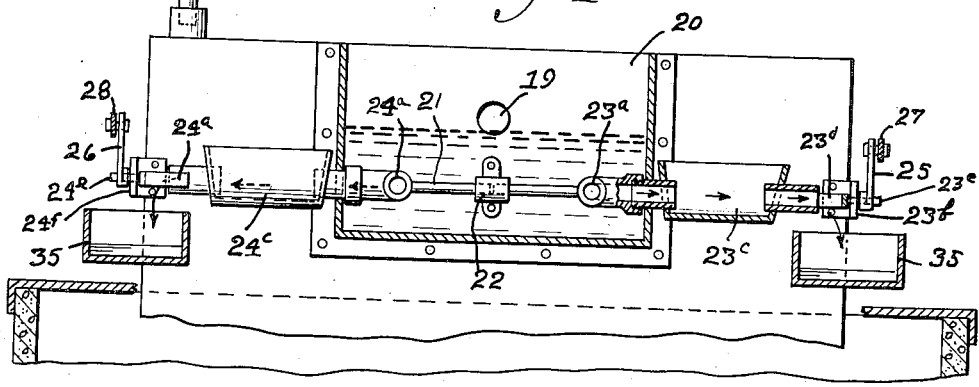
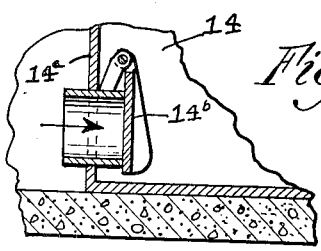
Inventor
Charles Vance Dame
by Sheridan Davis & Cargill
Attorneys June 18, 1940.  C. V. DAME  2,204,751
LIQUID DISTRIBUTING APPARATUS
Filed May 26, 1938  3 Sheets-Sheet 3

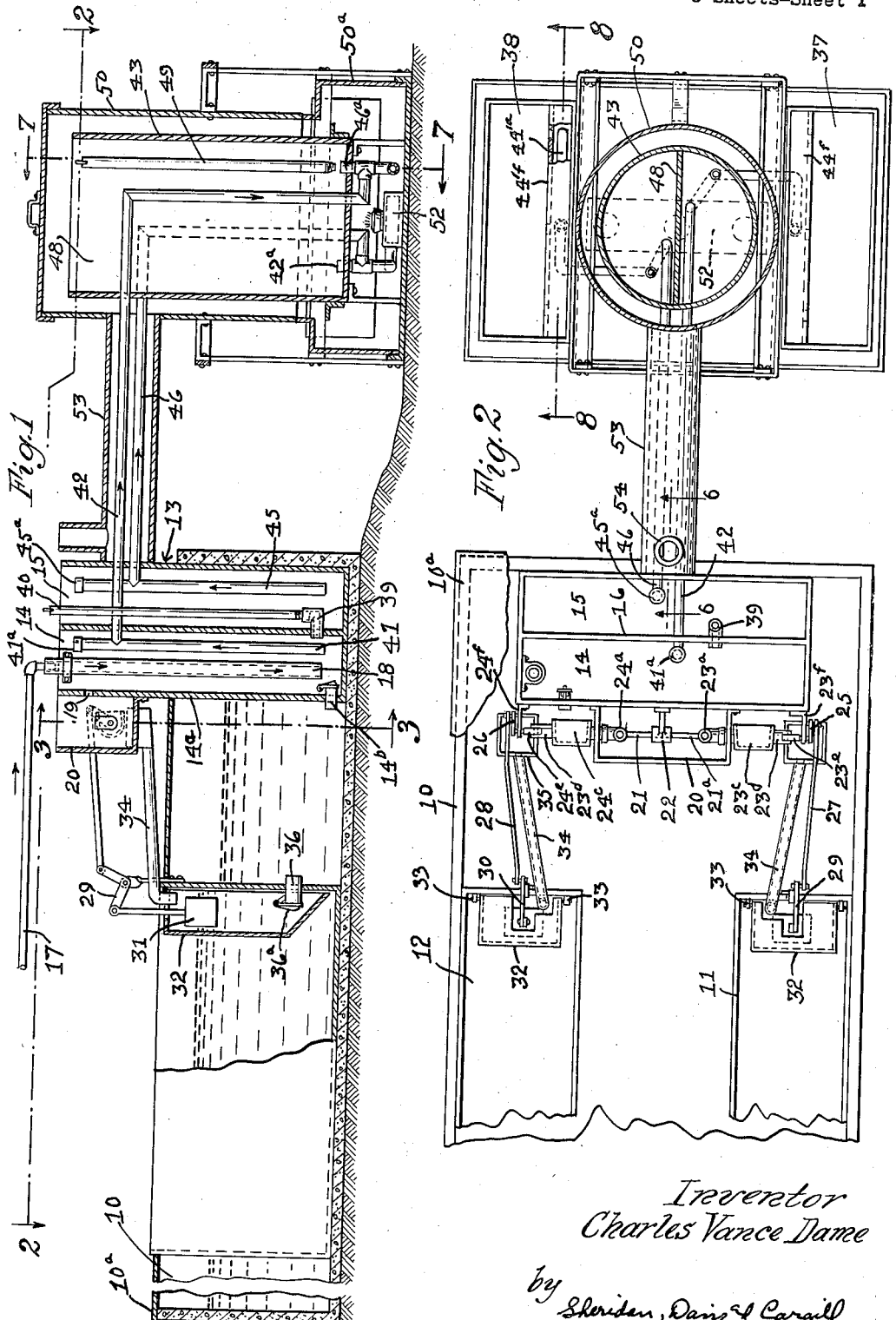

Inventor
Charles Vance Dame
by Sheridan Davis & Cargill
Attorneys.

Patented June 18, 1940

2,204,751

UNITED STATES PATENT OFFICE 2,204,751

LIQUID DISTRIBUTING APPARATUS

Charles Vance Dame, Lanark, Ill.

Application May 26, 1938, Serial No. 210,116

5 Claims. (Cl. 119—73)

This invention relates to improvements in liquid distributing apparatus and particularly to water distributing apparatus for supplying water to live stock drinking tanks or troughs.

One object of the invention is to provide apparatus for effecting the automatic distribution of water from a source of supply to water tanks, such as a drinking tank or tanks, and to a reservoir, whereby the drinking tanks will be supplied normally only with fresh water while the water of the reservoir will be utilized for drinking purposes only in case of temporary interruption of the supply of fresh water, and for insulating the fresh water in the drinking tanks against the heat of summer and the cold of winter.

An additional object of the invention is to provide a distribution system comprising a reservoir which receives the fresh water delivered by water supply means at times not required by the animals and which supplies the drinking tanks with water upon the temporary interruption of the fresh water supply or temporary inadequacy thereof, the arrangement being such that the reservoir water cannot be contaminated by the drinking tanks.

Another object of the invention is to provide distributing apparatus adapted to effect distribution of water to a plurality of drinking tanks for segregated groups of animals, in accordance with the present practice followed frequently at inspected dairy farms when the milch cows, for example, are not permitted to drink from tanks accessible to other farm animals.

A more specific object of the invention is to provide distribution apparatus comprising one or more fresh water receiving tanks or receptacles from which water is supplied as required in replenishing the tanks or troughs accessible to segregated groups of animals, means preferably being provided for heating the water during transit to certain of the drinking troughs during cold weather when desired.

Other objects of the invention relate to various features of construction and arrangement of parts shown in the accompanying drawings wherein:

Fig. 1 is a side elevation, largely in longitudinal section, through apparatus illustrative of the present improvements;

Fig. 2 is a partially top plan view and partially in section taken on line 2—2 of Fig. 1;

Fig. 3 is an enlarged vertical sectional view taken on line 3—3 of Fig. 1;

Fig. 4 is a broken sectional view corresponding to Fig. 3, but illustrating water diverting or distributing mechanism in a different position;

Fig. 5 is an enlarged broken sectional view taken on line 5—5 of Fig. 3;

Figure 7:
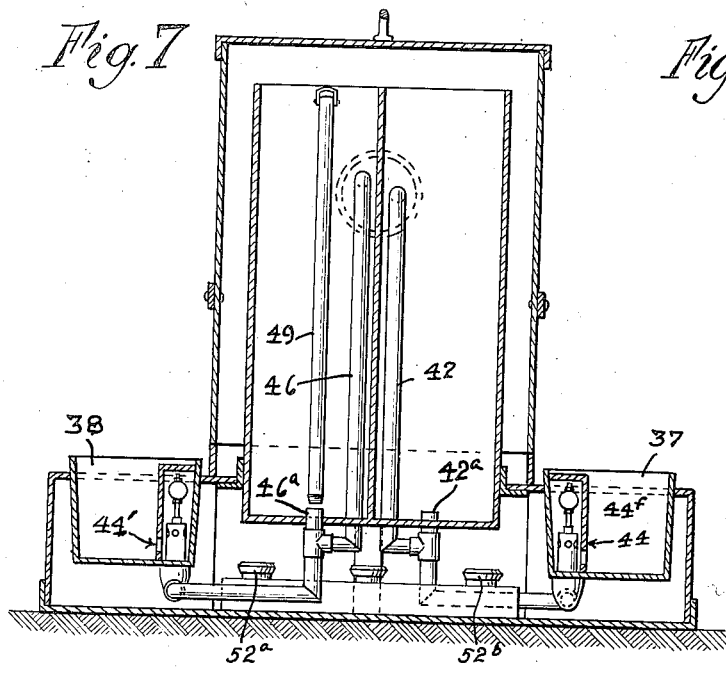
Fig. 7 is a vertical section taken on line 7—7 of Fig. 1.

In the drawings 10 indicates a relatively large tank or reservoir adapted to hold a reserve supply of water for use only in the event of interruption of a supply of fresh water as needed for replenishing the water troughs or tanks from which the animals drink. For the purpose of illustration there are shown two such drinking tanks 11 and 12 within the reservoir 10 (see Fig. 2). In one end of the reservoir is a fresh water receiving receptacle indicated generally by numeral 13 provided, in the embodiment illustrated, with two compartments 14 and 15 separated by a common partition 16.

A fresh water supply pipe 17 (see Fig. 1) conducts water from a power operated pump (not shown) to the compartment or chamber 14, the pipe 17 preferably communicating with a vertical pipe 18 open at its lower end whereby the fresh water will be discharged into the lower portion of the compartment 14. In the front wall 14a of compartment 14 is a discharge port 19 through which water may flow from the compartment into a distribution chamber 20 attached to the wall 14a. From the chamber 20 water is distributed by automatically operated means to the drinking tanks 11 and 12 in accordance with the requirements of the groups of animals to which the tanks 11 and 12 respectively are accessible, for example milch cows and horses or other segregated groups.

The distributing means mentioned comprises preferably a pair of axially alined rock shafts 21, 21a having a common bearing 22 at their adjacent ends as shown in Figs. 2, 3 and 4. The other ends of the shafts are connected respectively to rockable conduits indicated generally by numerals 23 and 24, each journaled in an adjacent end wall of the receptacle 20 and comprising an angularly disposed intake 23a, 24a, an outlet end 23b, 24b, and an intermediate open trough-like receptacle 23c, 24c, respectively. Packing or gaskets not shown may be employed to prevent leakage around the conduits 23 and 24 where the same extend through the receptacle side walls. The outlet or discharge portions 23b, 24b are shown as provided with yoke-like supports 23d, 24d, respectively, which carry stub shafts 23e, 24e extending through supporting brackets 23f, 24f attached to the receptacle 20. The outer ends of the stub shafts 23e, 24e are provided with crank arms 25, 26 connected with which are links 27 and 28, respectively. The links are connected to bell crank levers 29, 30 which support floats 31 located in the respective tanks 11 and 12. The floats preferably are provided with guards 32 hingedly or otherwise movably connected to the respective tank as at 33 to provide for convenient access to the interior. The guards 32 prevent the animals from interfering with the operation of the floats.

A pair of ducts 34, 34 having enlarged ends 35, 35 located beneath the outer ends of conduits 23 and 24 conduct water from the latter to the tanks 11 and 12 whenever the level of the water in the tanks is below a predetermined level. The floats 31 by means of the bell crank and link mechanism described above are adapted to oscillate the respective conduits 23 and 24 from the position shown in Fig. 4 to the position shown in Fig. 3 or vice versa. As shown in Fig. 4, the angular intake ends 23a, 24a are horizontal due to the lowering of water in the tanks 11 and 12 and consequent lowering of the floats 31 whereby water in the receptacle 20 can flow through the conduits to the respective tanks to replenish the supply therein. If one tank only requires replenishment, the conduit serving that tank only will be turned to the position shown in Fig. 4 and as the water level in the tank rises, the float will move the conduit to or toward the position shown in Fig. 3. When the angular intakes 23a, 24a are horizontally disposed as shown in Fig. 4, due to lowering of the water in the respective tanks, as will be the case when several animals are drinking or have drunk from the tanks, a greater portion of the water in the chamber 20 can escape through the conduits than where the members 23a, 24a are in the upright position of Fig. 3 or any intermediate position.

When water from the source of supply is flowing during replenishment of a tank or tanks, the fresh incoming water will of course flow through the conduits 23a, 24a to the tanks if such conduits are in a non-vertical position, but as the level in a tank or both tanks rises to the maximum, the respective conduits will be oscillated by the float mechanism to the position shown in Fig. 3 wherein the open trough portions 23c, 24c thereof are so tilted that the water flowing through the conduits will be discharged, not into the drinking tanks 11 or 12, but into the reservoir 10. Thus fresh water entering the system through pipe 17 during periods when the tanks 11, 12 are full may be discharged into the reservoir, thereby building up a reserve supply of water which not only insulates the tanks 11 and 12 against the heat of summer and the cold of winter, but is available for drinking purposes should the supply of fresh water through pipe 17 be interrupted at a time the water in the tanks 11 and 12, or either of them, drops to a predetermined level. By the arrangement described, no water that reaches a drinking tank 11 or 12 is returned or overflows into the reservoir 10 and hence there is avoided any likelihood of contaminating the reservoir water which may be distributed to the drinking tanks.

For the purpose of diverting water from the reservoir 10 to the tanks 11 and 12 or either of them upon interruption of or insufficient flow of water through pipe 17 at a time when the level of water in the tanks or tank has dropped below a predetermined level, the tanks 11 and 12 are provided with passages 36 each in an end wall of the respective tank and provided with suitable valves such as the hinged valves 36a (see Fig. 1). Thus, should the water in a tank 11 or 12 recede to a level below that of the water in the reservoir, the pressure on the valve 36a on the reservoir side thereof will exceed the pressure on the tank side and cooler water from the lower portion of the reservoir will flow through the passage 36 into the tank to raise the level to that of the reservoir. Normally the valves will be retained in closed position by the excess pressure head in the respective tanks 11 and 12 even should several animals drink at one time from the tanks due to the lowering of the angular intakes 23a, 24a, and rendering available for replenishment of the tanks the major portion of the water in the chamber 20.

Regardless of whether the water which flows into either tank 11 or 12 is fresh water from the chamber 20 or water from the reservoir 10, it will be water to which no other group of animals has had access since the top of the reservoir preferably is provided with a cover 10a which prevents drinking directly from the reservoir and protects the water therein from contamination from other sources.

The above described features of the invention are thus of distinct advantage in maintaining a supply of water in drinking tanks such as tanks 11 and 12, but additional drinking tanks or troughs may also be supplied with water from the receiving tank 13 and the water flow to such additional troughs may be selectively or separately conditioned or treated as may be found desirable by the apparatus shown.

Thus in Figs. 1, 2, 6, 7, and 8 are shown means for transferring water from the receiving tank 13 to troughs 37, 38, access to which may be had by two additional groups of segregated animals, for example, such as hogs, or hogs and sheep.

In Fig. 1 it will be noted that partition 16 is provided with a threaded conduit 39 through which, when the conduit is open, water can flow from compartment 14 into compartment 15. A threaded pipe 40 is shown in Fig. 1 by means of which such inter-communication can be interrupted, but where water is to be supplied to both troughs or tanks 37 and 38, the pipe 40 is removed, whereby the tank compartment 15 functions also in effecting selective distribution of the water.

Figure 8:
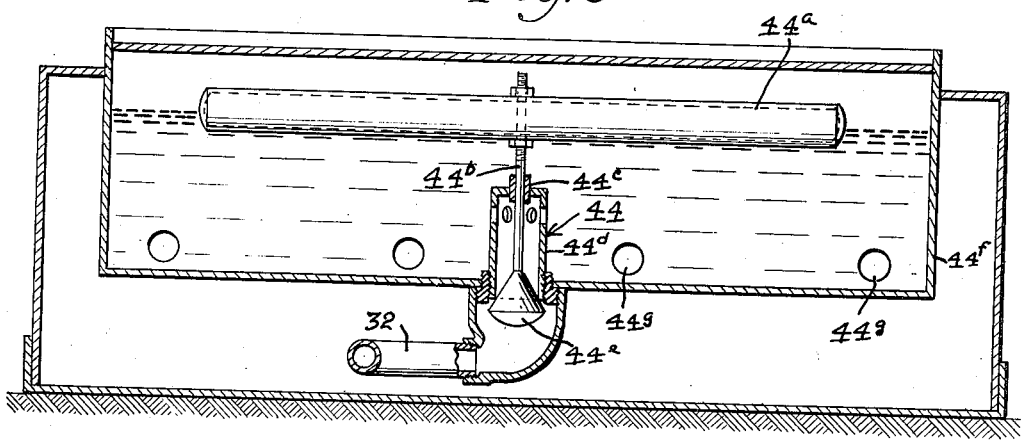
Fig. 8 is an enlarged section taken on line 8—8 of Fig. 2.

In compartment 14 is a pipe 41 open at the lower end and closed at the upper end normally by a screw cap 41a. A pipe 42 extends from the pipe 41, below the normal water level therein, into a warm water tank 43, through the lower end thereof and to a float valve 44 (see Figs. 7 and 8) located in the trough or tank 37. The valve comprises a float 44a, a stem 44b, guided by a sleeve 44c carried in the end of a tubular ported support 44d with the lower open end of which a valve closure member 44e cooperates to prevent entrance of water into the trough 37 when the latter is filled to the desired level, as illustrated in Fig. 8. The float valve mechanism is protected from damage by the animals by a removable shield 44f which is provided with water exit openings 44g.

In the distributing tank 15 a pipe 45 is provided (corresponding to pipe 41), having a cap 45a at the upper end above the level of the water, as determined by the outlet 19, and communicates with a pipe 46 at a point below the water level of the tank 15. Pipe 46 corresponds to pipe 42 and likewise preferably extends into the side of tank 43 and through the lower end thereof and thence to the trough 38. A float valve 44', corresponding to float valve 44, controls the level of the liquid in the trough 38, the valve having portions 44'a, 44'b, 44'c, 44'd, 44'e, 44'f, 44'g corresponding to elements 44a to 44g respectively of valve 44.

The troughs 37, 38 are located at levels below the level of the water in the tanks 14 and 15 and preferably below the normal level in the reservoir 10, as illustrated in Fig. 1, so the transfer or distribution of water to the troughs can be effected by siphonic action. The pipes 42 and 46, in addition to the valved outlets 44 and 44' above mentioned, are provided with threaded outlets 42a, 46a also which communicate with compartments 43a, 43b of the tank 43, a partition or wall 48 being provided to divide the tank 43. The threaded outlets 42a, 46a are adapted to be closed by means of plugs, such as the plug 49 shown in Fig. 1 in elevated or non-closing position. By this arrangement water from the pipes 42 and 46 can be directed into heating compartments 42a, 46a, respectively, as desired.

Figure 6:
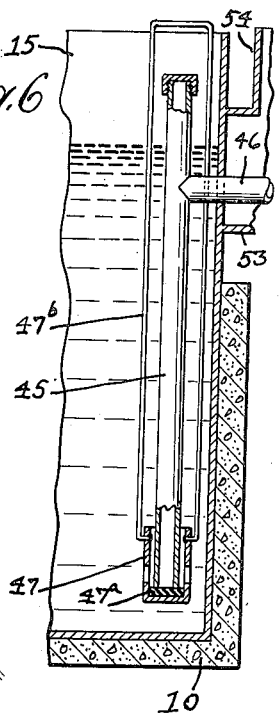
Fig. 6 is an enlarged broken vertical section taken on line 6—6 of Fig. 2.

In Fig. 6 the pipe 45 is shown as provided with a closure member 47 at its lower end, said member being cup-shaped and provided with a gasket 47a which seals the lower end of the pipe when the cup is raised to the position shown in said figure by means of a wire handle 47b which extends upwardly to or adjacent the top of tank 15. If the plug 49 of the outlet is in closing position and valve 44 is closed, as by pouring sufficient water in tank 37 to raise the float 44a or by other means, and the member 47 is elevated, water can be poured into the pipe 45, after removing the cap 45a, to fill the pipes 45 and 46. Thereupon, the cap can be replaced to seal the upper end of the pipe and the member 47 again lowered to normal position. Water will then flow through the pipe 46 siphonically whenever the float valve 44 is opened. If the plug 49 is removed, water can also flow into compartment 43a.

The pipe 41 also is provided with closure means for the lower end of the type shown in Fig. 6, such closure members being omitted from Fig. 1 for the purpose of avoiding confusion in details in said figure.

The outlet 42a of compartment 43b may be closed when desired by the plug 49 or a similar plug provided for that purpose in starting the siphonic flow through pipe 42 from tank 14 to the trough 38 or when no water is to be diverted to the compartment 43b.

The tank 43 preferably is enclosed in a shell or casing 50 having a suitable supporting frame 51. Within the base 50a of the casing 50 and beneath the tank 43 is a heater for heating the tank water during cold weather. The heater 52 may be of any suitable type, such as kerosene burners 52a, 52b, one under each tank compartment. The gases and products of combustion pass upwardly around the tank 43, through flue 53 (through which the pipes 42 and 46 extend) and exhaust through the stack 54.

The water flowing through the pipes 42, 46 to the respective tanks 37, 38, will be heated not only by gases in the flue 53, but by conduction from the heated water in the tank 43 when the respective burners are in operation.

By the arrangement shown, cold or warmed water or other liquid can be supplied to the troughs 37, 38 selectively and if desired medicinal preparation may be placed in the water of tank 15 for the animals drinking from trough 37, while untreated water is supplied to trough 38. Likewise milk or other liquid may be supplied to tank 15 for distribution to trough 37 if desired.

By the present arrangement of distribution several segregated groups of animals can be supplied with water which is protected from contamination by other groups, the supplied water coming from one common source, as by the pipe 17, or from the reservoir 10 should the supply from pipe 17 be temporarily interrupted. The distribution of the water is effected automatically and in accordance with the requirements of the several animal groups, thus saving time and labor in the performance of such chores. Should the normal supply of fresh water be interrupted and the water in the tanks 14 and 15 be lowered below the level of the water in the reservoir, the check valve 14b in the wall of the tank 14a will be opened and water from the reservoir will pass into the tanks 14, 15 for distribution to the tanks 37 and 38. Should the level of the water in the tanks 14 and 15 recede below the lower ends of pipes 41 and 45, the siphonic action will be interrupted and will require restarting as above described.

While I have shown and described a preferred embodiment of the improvements, I do not wish to be restricted specifically thereto as various changes in details and arrangement can be made without departing from the spirit and scope of the invention as defined by the appended claims.

I claim:

1. Water distributing apparatus comprising a reservoir, a drinking tank, a movable conduit having outlets arranged for non-simultaneous discharge of water for supplying water to the tank when the same is below a predetermined level and diverting water to the reservoir when the water in the tank reaches such level, and means operable by the water in the tank for moving said conduit for rendering operative one or the other of said outlets.

2. Water distributing apparatus comprising a reservoir, a plurality of drinking tanks associated therewith, water supply means, means comprising movable conduits each having a pair of outlets arranged for non-simultaneous discharge of water into said reservoir and into one of said tanks, and means associated with each tank and controlled by the water level therein for moving the respective conduit for rendering operative one or the other of the outlets thereof.

3. Water distributing apparatus comprising water supply means, a receptacle for receiving water therefrom, a drinking tank, a reservoir, a rockable conduit comprising an inlet within said receptacle and an outlet at the outer end for discharging water into said tank and an intermediate lateral outlet for discharging water into said reservoir, and means controlled by the water level of said tank for rocking said conduit in a direction to lower said lateral outlet to effect discharge of water through the same into said reservoir when the water in the tank is at a predetermined level and in the opposite direction to elevate said lateral outlet to effect discharge of water from said receptacle into said tank when the water therein is below said predetermined level.

4. Water distributing apparatus comprising a water receiving receptacle, a plurality of drinking tanks, a reservoir associated therewith, rockable conduits extending from said receptacle for directing water to each of said tanks when the water therein is below a predetermined level, said conduits each comprising a laterally disposed inlet within said receptacle and an intermediate lateral discharge outlet located exteriorly of said receptacle for discharging water into said reservoir when the water in the respective tank is above said predetermined level, the arrangement of the lateral inlet and lateral outlet of each conduit being such that the portion of the water in the receptacle available for replenishing the respective tanks is in excess of the water available in the receptacle for discharge into the reservoir whenever the water in a tank or tanks is below said predetermined level, and means operable by the level of the water in said tanks for rocking the corresponding conduits for controlling the flow of water to the tanks.

5. Water distributing apparatus comprising a water receiving tank, a plurality of drinking troughs, siphon conduits providing communication between said receiving tank and said troughs, a water heating tank provided with compartments with each of which one of said conduits communicates for supplying water to the heating compartments and to the respective troughs, and means for applying heat to said compartments and to said conduits.

CHARLES VANCE DAME.